Dec. 5, 1967    F. N. KOLBERG    3,356,204
CONVEYOR MECHANISM

Filed Jan. 12, 1966    2 Sheets-Sheet 1

FRITHJOF N. KOLBERG
INVENTOR.

BY *Lucas J D Koster*

3,356,204
CONVEYOR MECHANISM
Frithjof N. Kolberg, 2613 W. 29th St.,
Sioux Falls, S. Dak. 57105
Filed Jan. 12, 1966, Ser. No. 520,215
6 Claims. (Cl. 198—106)

ABSTRACT OF THE DISCLOSURE

A conveyor mechanism of the belt type and including a hopper. The belt is deflected so that the hopper may be mounted at a much lower position than ordinary. An oscillating floor is provided in the hopper to move the material from the hopper to the belt means for conveyance by the belt.

---

This invention pertains to material handling apparatus and more particularly to an improved hopper and belt arrangement for carrying gravel, crushed rock or the like into a screening plant.

The usual device for the moving of aggregate material into a screening plant, in which the fine aggregate is removed from the coarser material comprises a belt type conveyor onto which the material is gradually dumped from a hopper. The belt customarily runs between one drum journalled at a point above the screening plant hopper and a second drum below the conveyor hopper. The conveyor hopper is located high enough so that material will drop from its floor onto the belt stretched between the drums.

The feed from the conveyor hopper to the belt is actuated by a crank and pitman arrangement which causes longitudinal oscillation of the sliding floor of the hopper. Adjustment of the rate of feed is made possible by adjustment of the length of the crank which in turn adjusts the stroke of oscillation of the floor.

The present arrangement works fairly well in most applications. However, the height of the hopper required by the straight belt can cause severe loading problems in some instances where loading is carried on by using a bulldozer or end loader. Also, the adjustment to the length of stroke of the crank is a clumsy, mechanical operation, almost necessarily done by hand.

By my invention I provide a device having a much lower hopper and a novel feed mechanism. The feed mechanism is no longer adjustable only by hand, but is done by a power operation utilizing power sources readily available.

Figure 1:
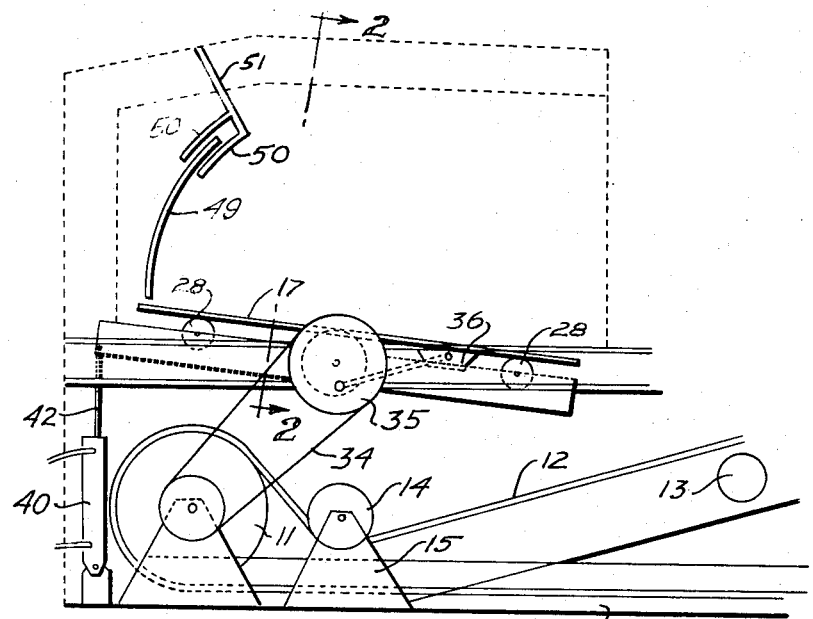
Figure 2:
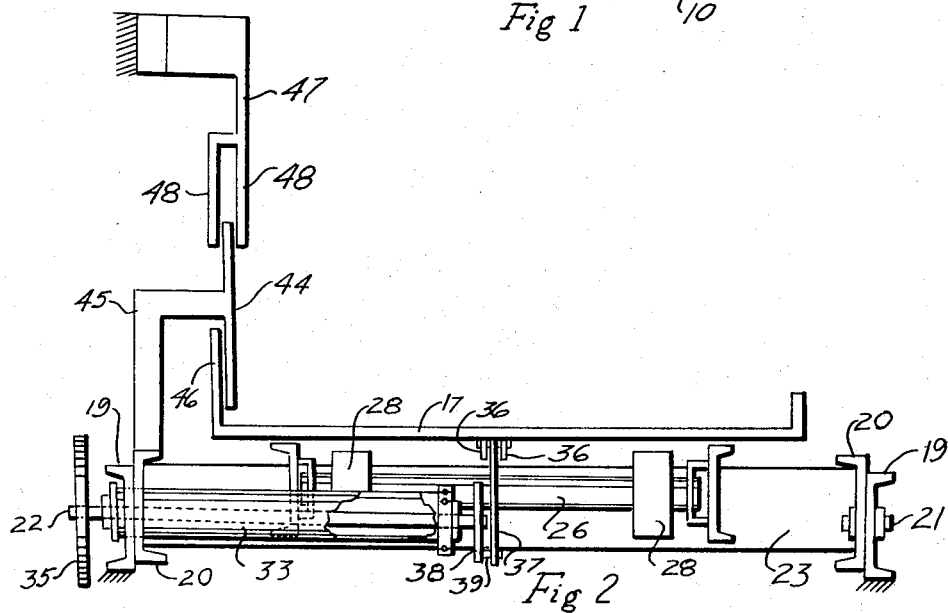
Figure 3:
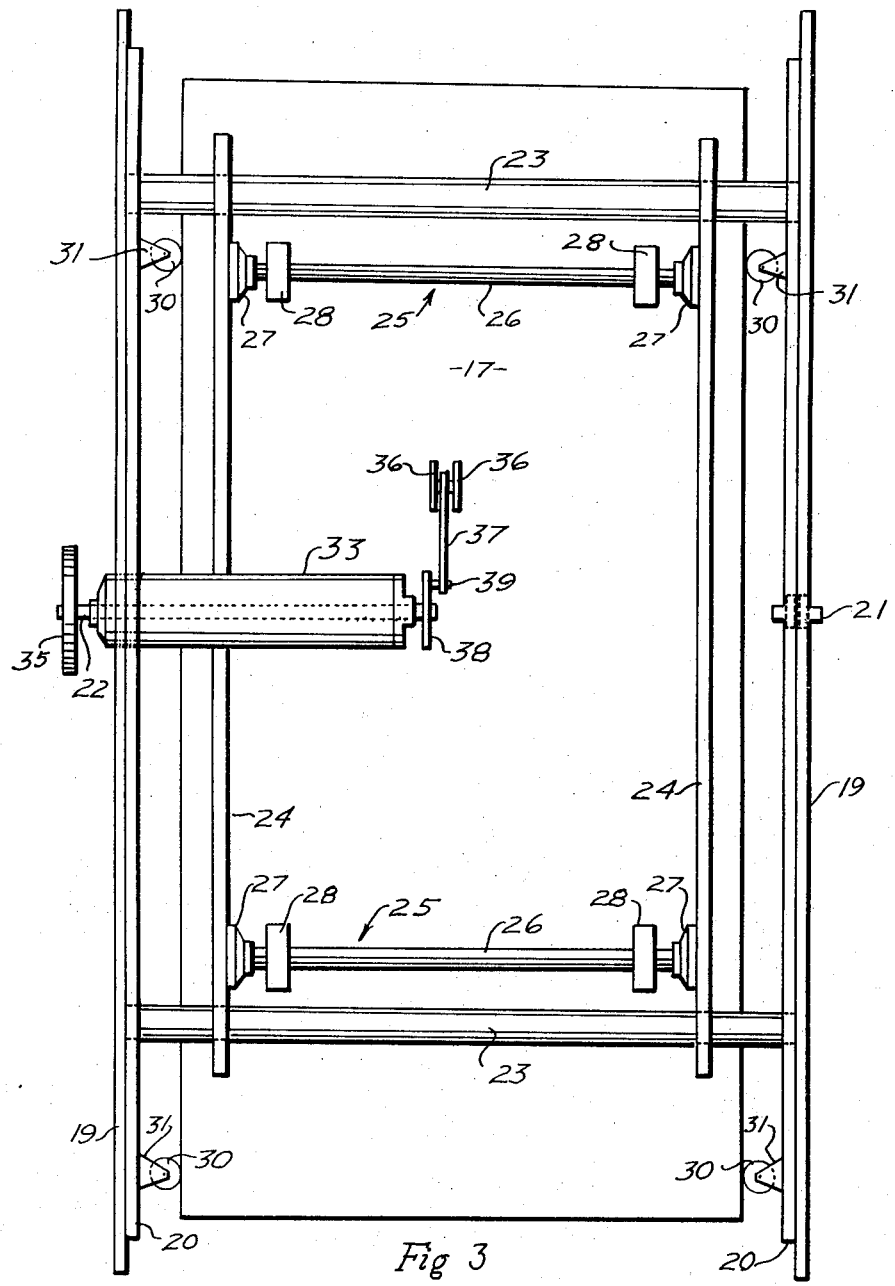

A more complete understanding of my invention and its embodiment may be had from a study of the following specifications and the figures in which:

FIG. 1 is a diagrammatic longitudinal sectional view of the hopper and lower end of the belt of my device, FIG. 2 is a partial sectional view from line 2—2 of FIG. 1, and FIG. 3 is a bottom plan view of the floor of the hopper and surrounding parts.

Briefly, my invention comprises a conveyor system in which the feed is controlled by tilting the hopper instead of by changing the stroke of the moving floor and in which the hopper can be lower and may be tilted because of a re-direction of the conveyor belt.

More specifically and referring to the drawings, my device is mounted on a framework or base designated generally at 10, and only the lower part of which is shown. The upper or head end of such conveyors is well known in the art and need not be altered to embody my invention.

At the lower end of the base 10 is journalled a tail drum or pulley 11 about which a conveyor belt 12 is draped. This belt runs up the device to a head drum or pulley not shown. Ordinarily, the belt runs in a direct line between the pulleys, although certain supporting idlers 13 may be used. In my device, however, I use a bend pulley 14 journalled on bracket 15 on the frame to hold the belt to a much lower position than the direct run. Thus, it is possible to locate the hopper floor 17 much nearer the base of the frame 10 than if the belt 12 were to extend directly from the drum 11.

The frame 10 also includes a fixed hopper mounting member 19 on each side. The hopper frame 20 is tiltably mounted on these members. The frame 20 is pivoted near its center on a pivot pin 21 on one side and on an axle 22 on the opposite side. Additional functions of this axle will be explained hereafter. The frame 20 includes transverse members 23 which carry a roller supporting member 24. These latter members are the principal support for base rollers 25 journalled on the supporting members 24 or on an axle supported by the members 24. I prefer to use the unitary roller composed of an axle 26 journalled in bearings 27 on the supporting members 24. Fixed to the axle are the rolls 28 which actually support the floor 17 of the hopper.

The frame 20 also carries side rollers 30 journalled on brackets 31 on the frame. These rollers serve as guides by rolling against the edges of the hopper floor 17. Thus, the floor is supported from beneath by the rolls 28 and is guided by the rollers 30. It is still free to move longitudinally of the hopper between the rollers 30 and over the rolls 28.

The means to provide oscillating motion of the floor is driven through the axle 22 previously described. This axle is journalled in a support housing 33 fixed to the frame 20. It is driven by a chain 34 (FIG. 1) through a sprocket 35 from the axle of the tail drum 11. The drive sprocket 36 is driven by the same means as that which drives the drum and thus the force is transmitted to the sprocket 35 rotating the axle 22. At a nearly central location of the floor, I provide a pair of ears 36 between which is pivotally mounted a pitman 37 driven by a crank on the axle 22. This crank may take the form of a disc 38 mounted on the axle and carrying a crank pin 39. It is now evident that driving the drum 11 will cause the floor 17 to oscillate longitudinally of the hopper in a manner common to such devices.

My device is unique in that the floor 17 can be tilted. Since the frame 20 carries the floor, the tilting of the frame also carries the floor to a tilted position. Pivotally mounting the frame on the axle 22 allows a proper drive along the axis of tilt for the oscillation of the floor. In order to control the tilt, I provide a hydraulic cylinder 40 mounted on the base 10 having a controlled piston whose rod 42 is connected to the frame 20. Thus, by controlling the piston in the hydraulic means, the tilt of the floor 17 may be controlled.

In order for the hopper to function properly, the sides must follow the floor as it is tilted. Therefore, I mount the sides 44 on brackets 45 fixed to the tiltable frame 20. A flange 46 on the edge of the floor 17 extends upward outside of the side 44 to hold the material in the hopper. Permanent side walls 47 may also be provided. These are fixed to the base or to some surrounding structure. In order to allow tilting of the walls 44, I provide a channel formed between two depending flanges 48 so that the side 44 may slide into the channel as it tilts upwardly.

The back of my hopper is similarly formed. The back wall 49 is fastened to the sides 44 and is carried thereby. It may have a slightly cylindrical form, being arcuate about the axis of tilt so that it will slide easily between the flanges 50 of the stationary back 51.

The operation of my device will be apparent to those skilled in the art. Material is dumped into the hopper from above while the device is being driven. As the material falls onto the oscillating floor 17 it is shaken toward the open end of the hopper. As it falls off the end of the floor 17 at the open end of the hopper it falls onto the belt 12 and is carried away. In order to control the feed from the hopper floor onto the belt, the floor (and its frame and attached side and back walls) can be tilted toward the belt to increase, or away from the belt to decrease the rate of feed. Because of the change of location or line of the belt 12 caused by the use of the bend pulley 14, it is possible to tilt the floor downward at its open end toward the belt and still maintain the floor at a reasonably low position relative to the surface on which my device is set.

Having thus described my invention in its embodiment, I am aware that further and extensive variations may be made therefrom without departing from the spirit and scope of my invention as limited only by the following claims.

I claim:

1. In a device for conveying particulate material, hopper and conveyor means comprising a base, driven tail drum means mounted on said base, conveyor means mounted on said base and driven by said drum means, means mounted on said base and engaging said conveyor means to change the direction of travel of said conveyor means to a line closer to said base, a tilting frame mounted on said base at a location above said conveyor means, floor means mounted on said frame for longitudinal movement, wall means mounted on said frame surrounding three sides of said floor means leaving one end open and drive means driven from said drum means and connected to said floor means whereby said floor means is oscillated to dump said material therefrom onto said conveyor means.

2. The device of claim 1 in which controllable means is operably connected between said tilting frame and said base to control the amount of tilt of said floor means.

3. The device of claim 1 in which said tilting frame tilts on an axis and said drive means includes an axle having an axis of rotation, said axes being on identical lines.

4. The device of claim 1 in which said drive means includes a crank driven from said drum means and a pitman connected to said floor means.

5. The device of claim 1 in which stationary walls are mounted adjacent to said wall means on the tilting frame, said wall means on the tilting frame being slidably disposed adjacent to said stationary walls.

6. The device of claim 4 in which said tilting frame tilts on an axis identical with the principal axis of said crank, and controllable means operably connected between said base and said frame means to control the amount of tilt of said frame means.

References Cited

UNITED STATES PATENTS

| | | | |
|---|---|---|---|
| 1,793,246 | 2/1931 | Philips | 198—230 |
| 2,576,781 | 11/1951 | Curioni | 198—48 X |
| 3,162,298 | 12/1964 | Murphy | 198—137 |

EDWARD A. SROKA, *Primary Examiner.*